(No Model.) 7 Sheets—Sheet 1.

P. V. W. WELSH.
COIN OPERATED PHOTOGRAPH MACHINE.

No. 490,180. Patented Jan. 17, 1893.

WITNESSES: INVENTOR
P. V. W. Welsh
BY Munn & Co.
ATTORNEYS.

(No Model.) 7 Sheets—Sheet 2.

P. V. W. WELSH.
COIN OPERATED PHOTOGRAPH MACHINE.

No. 490,180. Patented Jan. 17, 1893.

WITNESSES:
INVENTOR
P. V. W. Welsh
BY
Munn & Co.
ATTORNEYS.

(No Model.) 7 Sheets—Sheet 3.
P. V. W. WELSH.
COIN OPERATED PHOTOGRAPH MACHINE.
No. 490,180. Patented Jan. 17, 1893.
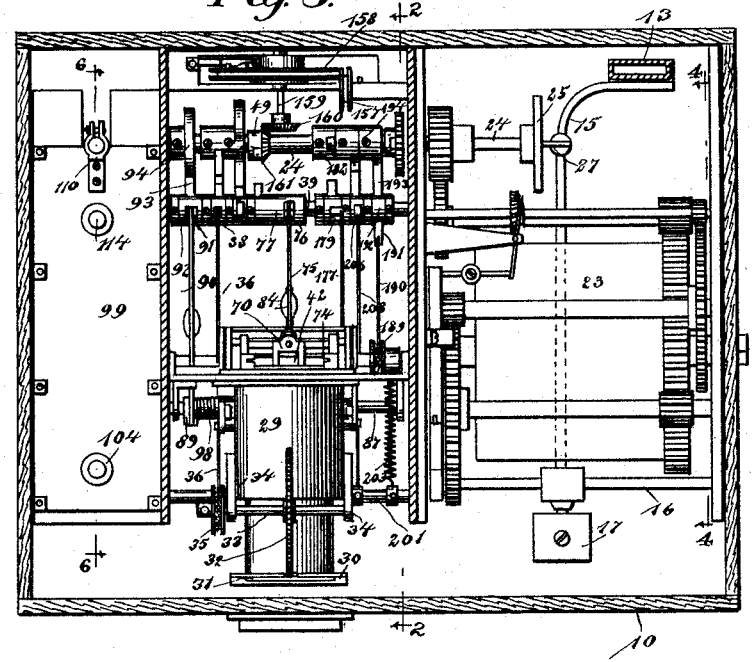
WITNESSES:
J. A. Criswell.
C. Sedgwick
INVENTOR
P. V. W. Welsh
BY Munn & Co.
ATTORNEYS.

(No Model.)
P. V. W. WELSH.
COIN OPERATED PHOTOGRAPH MACHINE.
No. 490,180. Patented Jan. 17, 1893.
7 Sheets—Sheet 4.
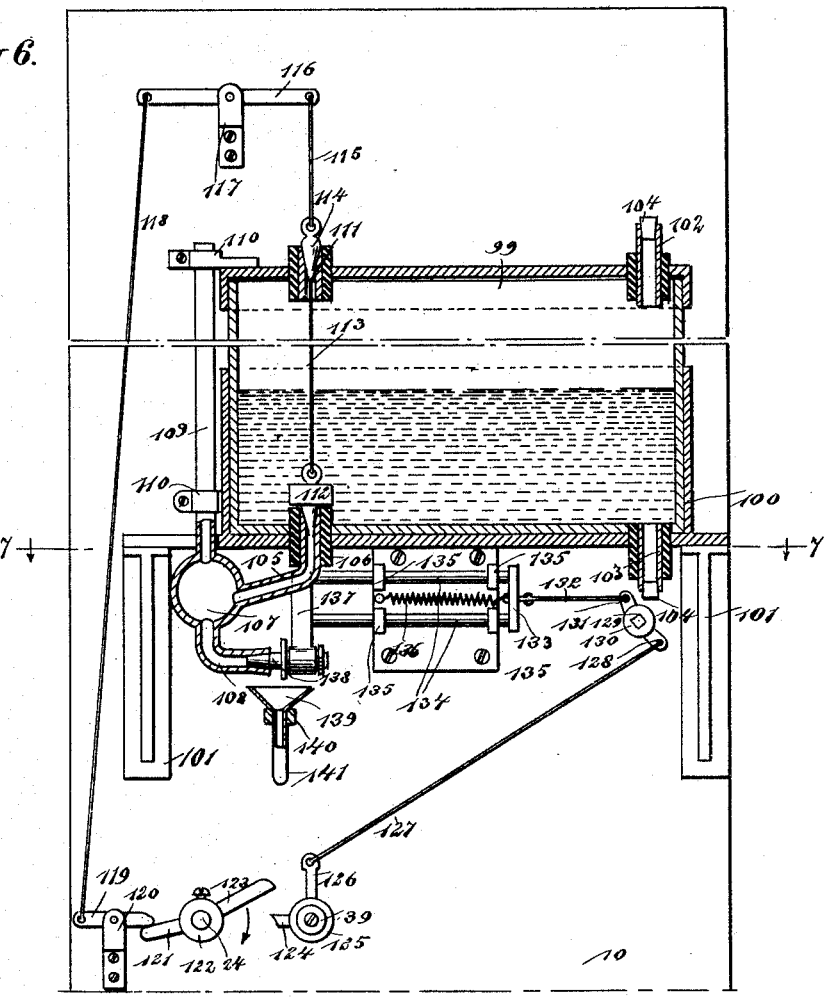
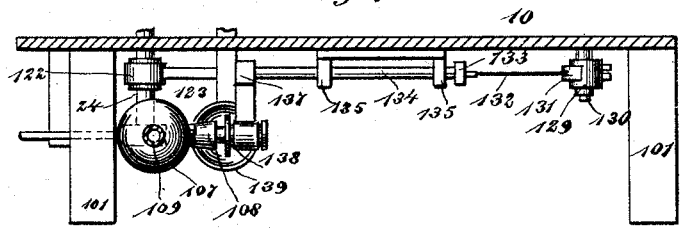
WITNESSES:
INVENTOR
P. V. W. Welsh
BY Munn & Co.
ATTORNEYS.

(No Model.) 7 Sheets—Sheet 5.
P. V. W. WELSH.
COIN OPERATED PHOTOGRAPH MACHINE.
No. 490,180. Patented Jan. 17, 1893.
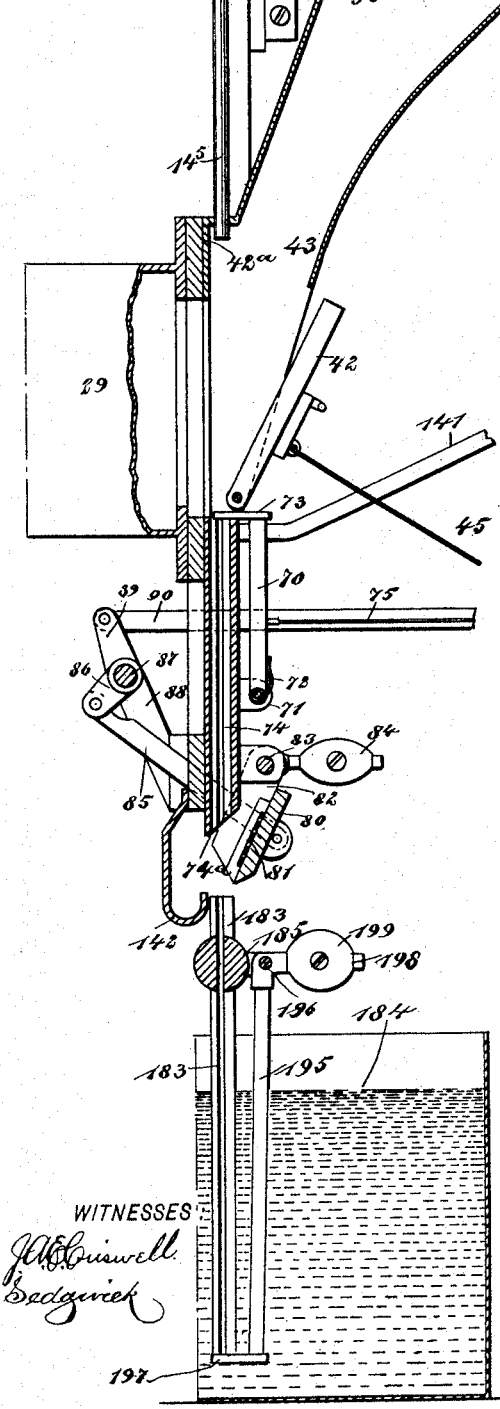
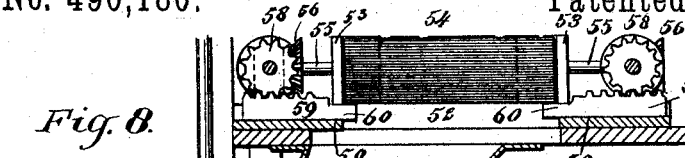
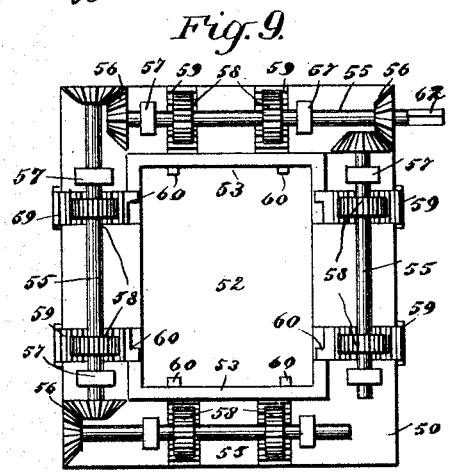
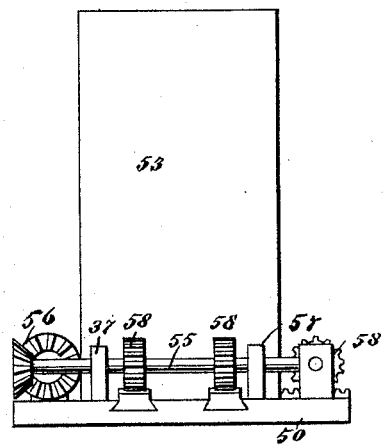
WITNESSES
J. A. Criswell
C. Sedgwick
INVENTOR
P. V. W. Welsh
BY Munn & Co.
ATTORNEYS.

(No Model.) 7 Sheets—Sheet 6.
P. V. W. WELSH.
COIN OPERATED PHOTOGRAPH MACHINE.
No. 490,180. Patented Jan. 17, 1893.
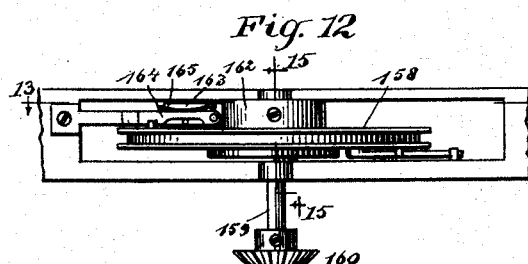
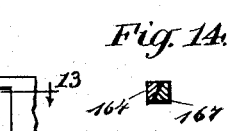
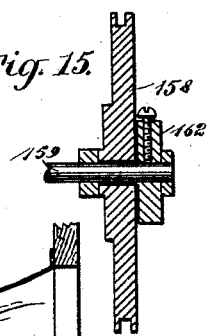
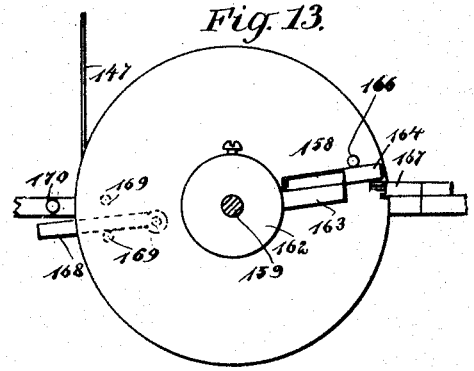
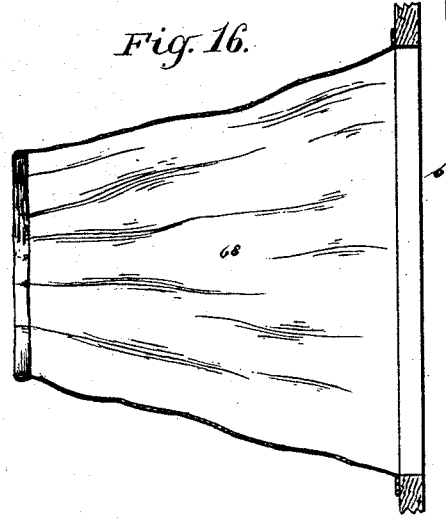
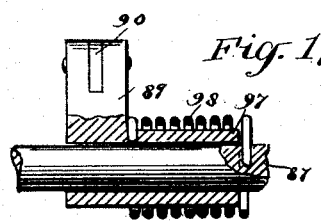
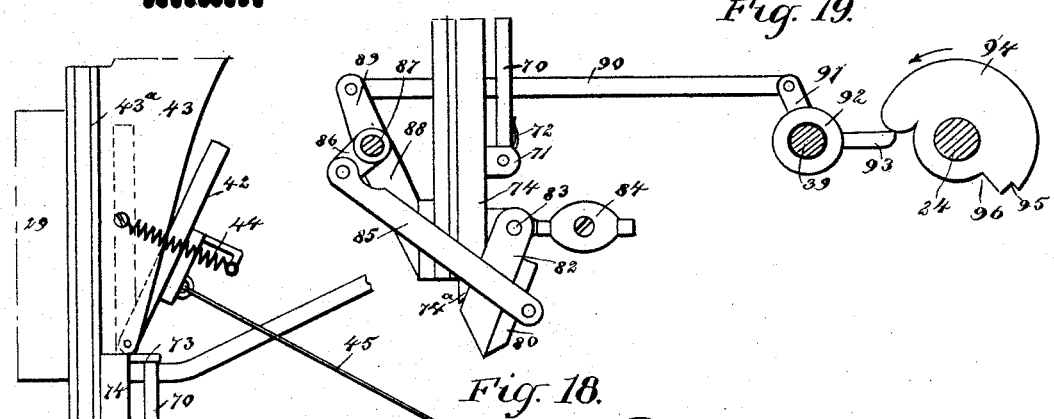
WITNESSES:
INVENTOR
P. V. W. Welsh
BY Munn & Co.
ATTORNEYS.
THE NORRIS PETERS CO., PHOTO-LITHO., WASHINGTON, D. C.

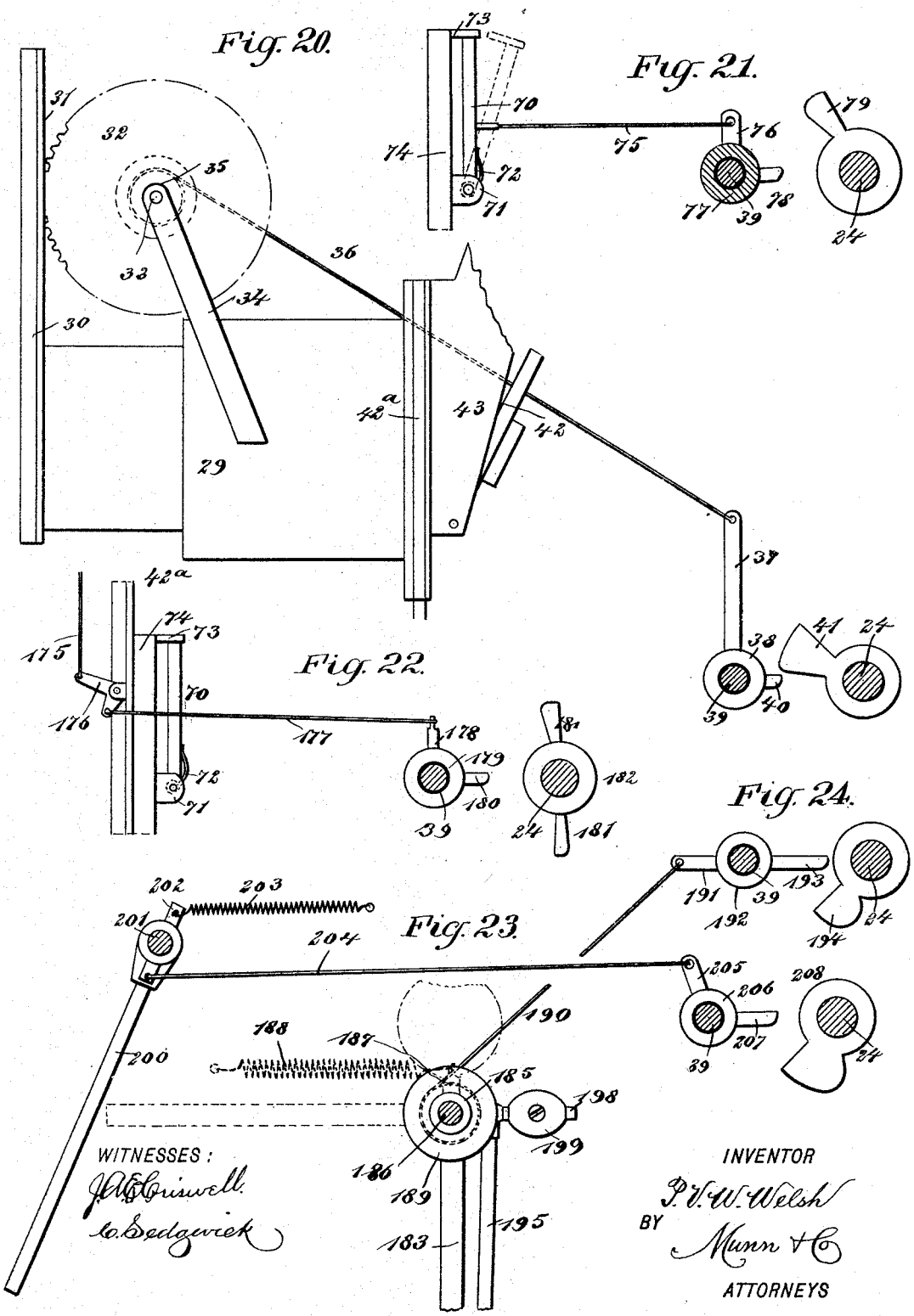

UNITED STATES PATENT OFFICE.

PIERRE V. W. WELSH, OF NEW YORK, N. Y., ASSIGNOR OF ONE-HALF TO WILLIAM F. FREEMAN, OF SAME PLACE.

COIN-OPERATED PHOTOGRAPH-MACHINE.

SPECIFICATION forming part of Letters Patent No. 490,180, dated January 17, 1893.

Application filed April 18, 1892. Serial No. 429,584. (No model.)

*To all whom it may concern:*

Be it known that I, PIERRE V. W. WELSH, of New York city, in the county and State of New York, have invented a new and Improved Coin-Operated Photograph-Machine, of which the following is a full, clear, and exact description.

My invention relates to improvements in coin operated photograph machines, and the object of my invention is to produce a machine, which by the dropping of a coin in the slot will be actuated, and which will take a perfect picture of any object in front of the lens tube and finish and automatically deliver the picture to the purchaser.

A further object of my invention is to construct the machine in such a way that the mechanism shall have very simple, easy and positive movements, to the end that the machine may work perfectly and wear well.

To this end, my invention consists in certain features of construction and combinations of parts, which will be hereinafter described and pointed out in the claims.

Reference is to be had to the accompanying drawings forming a part of this specification, in which similar figures of reference indicate corresponding parts in all the views.

Figure 1:
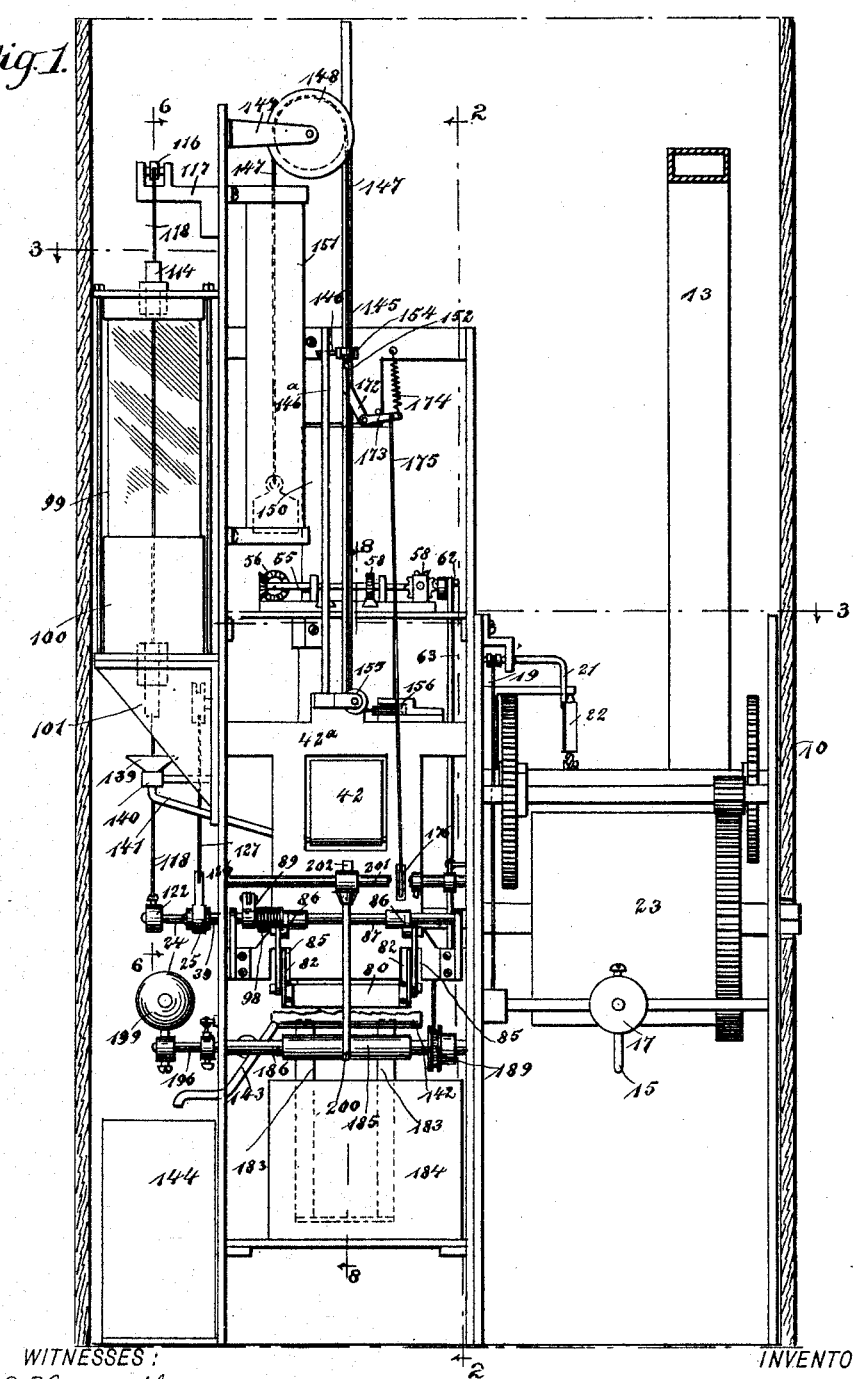
Figure 2:
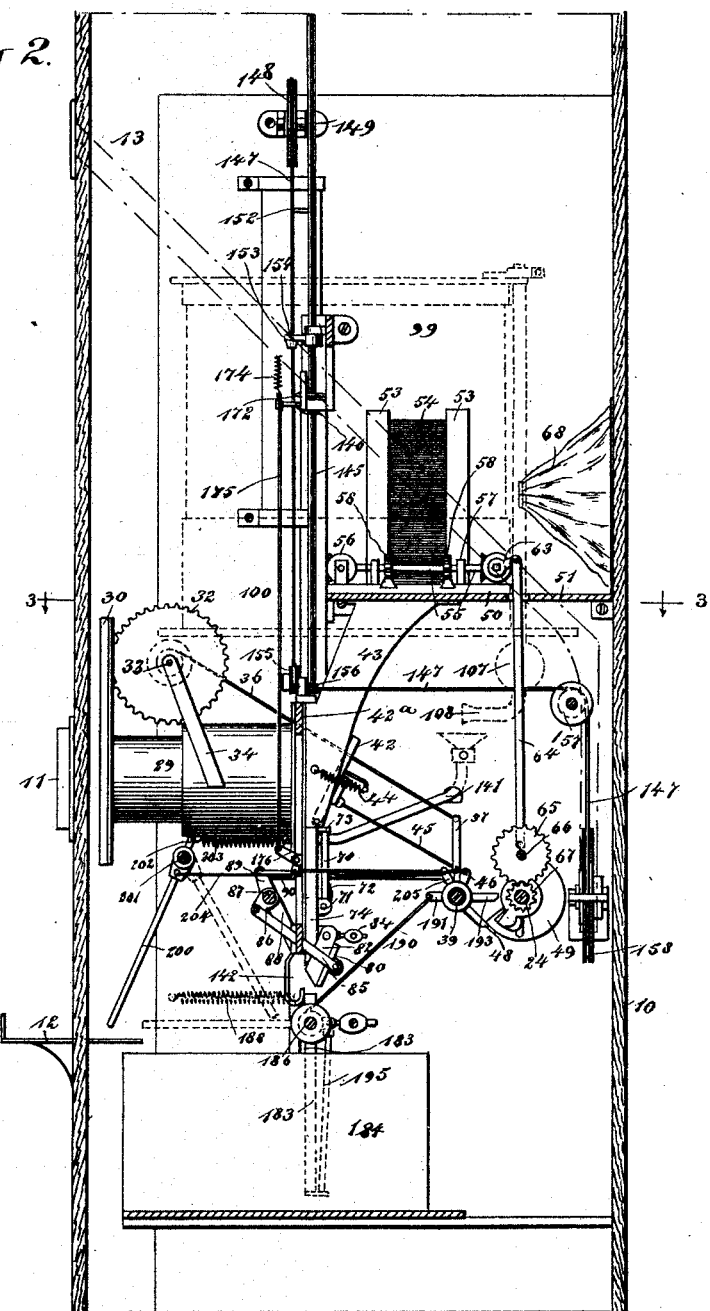

Figure 1 is a front elevation of the mechanism of the machine, with the lens tube removed and the case in vertical section; Fig. 2 is a vertical section on the lines 2—2 in Figs. 1 and 3; Fig. 3 is a sectional plan on the lines 3—3 in Figs. 1 and 2; Fig. 4 is an enlarged detail elevation, partly in section on the line 4—4 in Fig. 3, of the clockwork driving mechanism, and the coin-operated lever for tripping or releasing the clockwork; Fig. 5 is a detail section on the line 5—5 in Fig. 4; Fig. 6 is an enlarged vertical section through the tank which carries the developing liquid, showing also in detail the valve mechanism for controlling the flow of the liquid; Fig. 7 is a sectional plan on the line 7—7 in Fig. 6; Fig. 8 is an enlarged vertical section on the line 8—8 in Fig. 1, showing in detail the mechanism for delivering the plates, for controlling the developing bath, and for delivering the plates into the fixer and lifting them from the same; Fig. 9 is a plan view of the feed mechanism for supplying the photograph plates to the feed chute; Fig. 10 is a side elevation of the same; Fig. 11 is a detail perspective view of one of the photograph plates; Fig. 12 is a detail plan on an enlarged scale of the mechanism for actuating the plate plunger; Fig. 13 is a sectional elevation of the same, on the line 13—13 in Fig. 12: Fig. 14 is a cross section of the releasing studs of the plunger-operating mechanism; Fig. 15 is a vertical cross section on the line 15—15 in Fig. 12; Fig. 16 is an enlarged detail sectional view of the flexible hood through which the photograph plates are inserted in the machine; Fig. 17 is an enlarged detail sectional view of the spring connection between the bath tank valve controlling shaft and its operating crank arm; Fig. 18 is an enlarged detail view of the cam mechanism for operating the photograph plate fly which holds the plate in position at the inner end of the lens tube; Fig. 19 is an enlarged detail sectional view of the cam mechanism for operating the developing bath valve; Fig. 20 is an enlarged detail view of the mechanism for operating the lens shutter; Fig. 21 is a detail view of the cam mechanism for dropping the photograph plate after exposure; Fig. 22 is a detail view of the plunger releasing cam mechanism; Fig. 23 is an enlarged detail view of the picture delivering mechanism; and Fig. 24 is a detail view showing the mechanism for holding the photographic plate in the fixer, and lifting it from the fixer.

The machine is provided with a main case 10, having an exposure opening 11 in the front side, and a delivery tray 12 beneath it, on which the finished pictures are thrown. The case is also provided with a coin chute 13 in which the coin is deposited, and this delivers, as shown in Fig. 4, upon the coin plate 14 on the free end of a lever 15, which lever is secured to a shaft 16, journaled in suitable supports, and the shaft has a counterbalancing weight 17 on one side, and on the other a projecting arm 18, connecting by a rod 19 with a tilting lever 20, which is pivoted near the center, and which at its free end carries a tripping arm 21 adapted to extend into the path of a fan 22, which is driven by the clock-work 23.

The coin chute and the clockwork mechanism are not shown in detail, as the construction above described is similar to that shown in Letters Patent, No. 465,740, of the United States, issued to me December 22, 1891.

The clockwork 23 drives the main shaft 24, which extends horizontally through the back portion of the machine, as shown in Fig. 3, and this shaft carries the cams which effect the various operations of the several parts of the machine, as hereinafter described. On one end of the driving shaft 24 is a disk 25, having a notch 26 in one side, and this arrangement is also similar to that shown in my former patent referred to above. It was found, however, in working the mechanism described in the former patent, that when the tripping arm on the lever 15 dropped from the slot 26, it would sometimes return quickly enough to enter the slot before the revolution of the disk, and consequently the machine would not work. To obviate this difficulty, an arm 26$^a$ is secured to the lever 15, and has its upper end 27 bent at a right angle so as to enter the slot 26. The slot 26 is partially covered by a flat spring 28, which is secured to the circumference of the disk 25, and the free end of which lies loosely over the slot. It will be seen that when the lever 15 is depressed by the dropping of the coin upon its free end, the bent end 27 of the arm 26$^a$ will be carried below the spring 28, and the spring immediately flies back to place, so that if the lever should return quickly, the bent end 27 of the arm would strike the spring and be prevented from entering the slot in the disk. When the arm is removed from the disk, the clockwork starts so that the machine is operated, and as the disk revolves, the bent end 27 of the arm will pass between the spring 28 and the face of the disk, so as to again enter the slot when the latter is brought into position to register with the arm.

The machine is provided with a lens tube 29 of the common form, which is arranged opposite the exposure opening 11, and at the front end of the lens tube is a frame 30 in which the shutter 31 is held to slide (see Figs. 3 and 20) and a rack on the shutter engages a gear wheel 32, carried by a shaft 33 which is journaled in suitable hangers 34, this shaft having also a drum 35 thereon to which is secured a cord or cable 36, and the latter extends backward and downward in the machine and is secured to an arm 37 of a sleeve 38, which is journaled loosely on a counter-shaft 39, arranged parallel with the shaft 24, as shown in Fig. 3, and the sleeve has a projecting arm 40, adapted to register with a cam 41, carried by the driving shaft 24. It will thus be seen that at the right time the cam 41 will tilt the arms 40 and 37, thus pulling upon the cord 36, revolving the shaft 33 and gear wheel 32, and raising the shutter. As soon as the cam 41 passes the arm 40, the shutter will drop back to place of its own weight.

At the inner end of the lens tube 29, is a swinging fly 42, which is adapted to swing up parallel with the opening of the lens tube in the frame 42$^a$ (see Fig. 8) and the fly 42 is normally pressed into a vertical position by a spring 44, which is secured to an arm on the fly and to one side of the chute 43 in which the fly swings, as best shown in Fig. 18. The chute 43 extends downward to the inner end of the lens tube, and through it the photograph plates are dropped as described below. The fly 42 has secured to its back side a rod 45, which connects with an arm 46 upon a sleeve 47, which is journaled loosely on the shaft 39, and an arm 48 of the sleeve extends into the path of a cam 49 on the driving shaft 24. When a plate is dropped in front of the fly 42, the cam 49 will be in the position shown in Fig. 18, and as soon as the driving shaft 24 starts, the cam will move and the side of the cam which is cut away will be brought opposite the arm 48, thus releasing the arm and permitting the spring 44 to swing the fly 42 into a vertical position so as to adjust the plate. The upper end of the plate chute 43 registers with an opening 52 in the base 50 of the feeding mechanism, which base is held upon the partition 51 in the main case. The plate holder is carried upon this base 50, and consists of two similar and semi-rectangular sides 53, an open space being left between them, as shown in Fig. 9, and the plates 54 are held one above another within the holder, and between the two sides 53. Extending around the holder, and at right angles to each other, are shafts 55, which are geared together by bevel gear wheels 56, so that all will turn in unison, and the shafts are journaled in supports 57. The shafts 55 also carry gear wheels 58, which engage sliding racks 59 held at right angles to the shaft and adapted to slide on the base 50. The racks 59 have projecting inner ends 60, which are adapted to extend beneath the plates 54, and the shafts and racks are arranged so that the racks will be moved at every revolution of the shaft, but the racks on the sides and ends of the holder will move alternately, that is to say, when the end projections 60 are beneath the plates 54, as shown in Fig. 8, the side projections will be withdrawn and vice versa. This arrangement enables the plates to be dropped one by one, as when one set of projections is withdrawn the other will be moved in. To enable this arrangement to be successfully carried out, the plates 54 are provided on the sides and ends with notches 61, the side notches being produced in one plate and the end notches in the next, and the notches are adapted to slip over the projections 60. The plates 54 are of the usual kind, such as are used in taking tintypes. One of the shafts 55 is provided with a square end 62, which is adapted to receive a crank 63, as shown in Fig. 2, and the crank connects by means of a pitman 64 with a gear wheel 65 on the counter-shaft 66, which is held above and parallel with the driving shaft 24, and the gear wheel 65 engages a pinion 67 on the driving shaft 24. It will thus be seen that every revolution of the driving shaft will turn the shaft 55 so as to deposit a plate in the chute 43.

In order that the sensitive plates may be placed in the holder without undue exposure, a flexible hood 68 is provided at one side of the holder, as shown in Figs. 2 and 16, the hood surrounding an opening 69 in the side of the case, and a package of plates may be thrust in through the hood and adjusted in the machine without exposing them to the light.

Beneath the chute 43 and the adjusting fly 42, is a swinging arm 70, which is pivoted at its lower end in lugs 71 and is normally pressed into a vertical position by a spring 72, as shown in Figs. 8 and 22, and the upper end of this arm is provided with a plate 73 which is adapted to pass beneath the fly 42 and close the top of the developing bath tank 74, as shown in Fig. 8. The plate 73 will thus support a photograph plate 54, and when the arm 70 is pulled out, it carries the plate 73 with it, and the plate 54 is dropped into the bath tank 74. To effect this movement, the back of the arm 70 connects by a rod 75 with an arm 76 on a sleeve 77 which is journaled loosely on the shaft 39, and the sleeve has a projecting arm 78, extending into the path of a cam arm 79 on the driving shaft 24, this arrangement being shown in Fig. 21, and when the arm 78 is struck, the arm 76 will be tilted and the arm 70 pulled back, to be returned to position by the spring 72.

The lower end of the bath tank 74 is cut off diagonally, as shown at 74ª in Fig. 8, and this end is adapted to be closed by a valve 80, to prevent the developing liquid from running out, and the valve 80 has on its inner side a packing 81, adapted to fit snugly upon the lower end of the bath tank. The valve 80 has side pieces 82 adapted to close over the sides of the tank, and these side pieces are prolonged upward and pivoted to a shaft 83, which is journaled in suitable supports at the back of the tank, and the valve is counterbalanced by a weight 84 secured to the shaft 83, and consequently it may be very easily actuated.

Pivoted on opposite sides of the valve 80 are the upwardly and forwardly-extending arms 85, which are pivotally secured to cranks 86 on a shaft 87, which is journaled in hangers 88 in front of the bath tank 74, and a crank 89 on the shaft 87, connects with a rod 90 which extends backward and is pivoted to an arm 91, on the sleeve 92 which is journaled on the shaft 39, as shown in Fig. 19, and has an upwardly-extending arm 93, which projects into the path of a cam 94 on the driving shaft 24. The cam 94 is nearly semi-circular in form, and consequently will bear for rather more than half the time on the arm 93 and thus hold the valve 80 in position, but at one end of the plane bearing surface of the cam is a notch 95, which permits the valve to slacken slightly when the arm 93 drops into it, and half of the cam is cut away at 96, so as to release the arm 93 and permit the valve 80 to drop down from the bath tank so that the liquid therein may escape. When the arm 93 drops into the notch 95 the valve 80 drops slightly and deflects the liquid into a gutter 142 described hereinafter, and thus prevents the liquid from dropping into the fixer.

It is obvious that the tank 74 must be kept tightly closed while the picture is being developed, and to obviate the necessity of a very nice adjustment of the levers the following connection between the crank 89 and the shaft 87 is employed. The crank 89 has on one side a hub 97, which is loosely mounted on the shaft 87, and on this hub is a spiral spring 98, one end of which is fixed to the crank and the other end to the shaft, and consequently this yielding connection will enable the valve to be jammed tightly to place with no fear of breaking anything, or of the leaking of the valve.

The developing liquid is carried in a removable tank 99, which is held in a receptacle 100 in the upper portion of the machine, this receptacle being carried by brackets 101 secured to a partition in the case 10. The developing tank 99 has an inlet 102 through which it may be filled, and an outlet 103 through which it may be emptied, and these openings are closed by stoppers 104, as shown in Fig. 6. A tube 105 leads from the lower portion of the tank, this tube having its upper end enveloped by a packing 106, and the tube delivers into a bulb 107, which holds a charge for the bath tank 74, and which has an outlet pipe 108 on the under side. An air pipe 109 opens from the upper portion of the bulb 107, and extends upward through suitable supports 110, and the object of this is to enable the bulb to be quickly filled and emptied. The outlet tube 105 is closed by a weighted conoidal valve 112, and this connects by a cord or rod 113 with a valve 114, which is adapted to close the air inlet 111 of the tank, and consequently the two valves may be simultaneously operated. The valve 114 connects by a rod 115 with one end of a tilting lever 116, which is pivoted in a support 117, and the opposite end of the lever connects by a rod 118 with a tilting lever 119, this being centrally pivoted in a hanger 120, and the free end of the lever 119 extends into the path of an arm 121 on the sleeve 122, which is secured to the shaft 24, and the sleeve has a projecting arm 123 extending into the path of the arm 124 of the sleeve 125, which is held loosely upon the counter shaft 39, and has a projecting arm 126 which connects by a rod 127 with one arm 128 of a bell crank 129, which is pivoted on a stud 130 beneath the tank 99, and which has its upper arm 131 connected by a rod 132 with the yoke 133 of the parallel rods 134, which are held to move horizontally beneath the tank 99 and in the supports 135, the rods being normally pressed forward by a spring 136, and the rods have at their front ends a crosshead 137, an arm on the lower end of which carries a valve 138 which enters and closes the tube 108 leading from the bulb 107. The tension of the spring 136 will therefore normally hold the valve closed so as to stop the tube.

Beneath the outlet tube 108 is a funnel 139, supported in a hanger 140, and leading from the funnel is a tube 141 which delivers into the top of the bath tank 74. It will be seen then that at every revolution of the driving shaft 24, the valves 114 and 112 will be actuated so as to charge the bulb 107, and the valve 138 will be withdrawn so as to carry the developing charge to the bath tank 74. When the bath tank is emptied, the liquid flows into a small gutter 142, which is arranged beneath and a little to one side of the bath tank, and the shape of the tank and the valve beneath it will serve to deflect the liquid into the gutter. From the gutter the exhausted liquid is conducted through a tube 143, and delivered into a waste tank 144, which is held in the lower part of the case.

To insure the quick movement of the photograph plate through the tank 74 after the picture has been developed a plunger 145 is used, which is held normally above the back of the lens, as shown in Fig. 8, and moves downward through the chute 43, and this plunger has on one side a pin 146 held to move in a guide 146ª, see Fig. 1, and the plunger is held normally upward by a cord 147, which moves over a pulley 148 held in the hanger 149, as shown in Fig. 1, and the cable or cord is secured to a weight 150, which is held to slide in a box 151. Instead of the cord 147, a wire may be used, and is preferably employed at the part where the arm 154 runs upon it. The plunger has on one side a laterally-extending stud 152, see Fig. 2, which is adapted to rest on a tripping lever as hereinafter described, and the plunger has also a laterally-extending perforated arm 154, which extends into the path of a stop 153 on the cord or cable 147, and consequently the stop and arm will move up and down together, the stop serving to hold the plunger in a raised position. The cable 147 extends downward and backward through the case over guide pulleys 155, 156 and 157, and the lower end of the cable is fixed to a drum 158, which turns loosely on a shaft 159 journaled in a suitable supporting frame in the back part of the case and at right angles to the driving shaft 24, the shaft 159 having at its inner end a bevel pinion 160, which meshes with a pinion 161 on the driving shaft, as shown in Fig. 3.

At one side of the drum 158 is a collar 162, which is fixed to the shaft 159, and projecting from one side of the collar and parallel with the sides of the drum, is an arm 163 to which is pivoted a lever 164, and the latter is pressed by a spring 165 against the side of the drum 158, so as to engage a stud 166 on the drum, and consequently when the collar is turned, the drum will be carried with it. The lever 164 is beveled or inclined on the side next the drum, as shown in Fig. 14, and extending into the path of the lever is an oppositely-inclined arm 167, which is fixed to a suitable support, and when the arm comes in contact with the lever, the lever will be crowded away from the drum, thus permitting it to free itself from the stud 166, and this will provide against the drum's making more than one revolution at a time, and will also permit the counterbalance or weight 150 to return the drum and plunger to their normal positions.

To further guard against the turning of the drum 158 more than a revolution, and to permit it to oscillate slightly at the end of its stroke, a lever 168 is pivoted loosely on the drum and held to play loosely on studs 169, as shown in Fig. 13, and the free end of the lever projects outward so as to engage a fixed stud 170, held to an adjacent fixed portion of the case. It will thus be seen that the lever 168 will first strike the stud on the under side and then on the upper, and the movement of the lever will permit the drum to turn a complete revolution.

The plunger 145 is held upward by a bell crank 172, one arm of which engages the pin 152 on the plunger, as shown in Fig. 2, and the bell crank has its lower arm held to swing upward against the stud 173, and is normally held against the stud by a spiral spring 174. A rod 175 leads downward from the bell crank and connects with another bell crank 176, which is pivoted to the frame 42ª, as shown in Fig. 22, and the lower arm of this bell crank connects by a rod 177 with an arm 178 of a sleeve 179 held loosely to the shaft 39, and having an arm 180 at nearly right angles to the arm 173, the arm 180 extending into the path of the arms 181 which project from diagonally opposite sides of a hub 182 carried by the driving shaft 24. It will thus be seen that the plunger will be tripped at every half revolution of the driving shaft, so as to permit it to move freely down and up through the bath tank. The object of this arrangement for tripping the plunger twice, is to provide for successive movements of the photograph plate so as to force it first from behind the lens tube, and second through the bath tank 74. The first tripping of the bell crank 172 will release the arm 154, which will have dropped upon it, thus permitting the plunger to drop to the top of the tank 74, and the second tripping of the plunger, that is, when the bell crank is moved from beneath the pin 152 which will have dropped upon it, will permit the plunger to drop downward through the bath tank and expel the photograph plate.

When the photograph plate drops from the bath tank after being developed it passes into a grooved receiver 183, which consists of two connected side pieces grooved on their inner sides, and this receiver extends downward into a fixing bath carried in the tank 184. No means is provided for changing this bath as it will last for a comparatively long time, and when exhausted it may be easily renewed. The receiver aligns vertically with the bath tank and has a slotted drum 185 at the top, which is carried by a shaft 186, and an arm 187 on the upper side of the shaft is pressed by a spiral spring 188, so as to hold the receiver 183 in a vertical position. The shaft 186 has a grooved pulley 189 thereon, carrying a cable 190, which connects with an arm 191 of a sleeve 192, held loosely on the counter-shaft 39, and another arm 193 of the sleeve extends into the path of a cam 194 of the driving shaft 24, so that at every revolution of the driving shaft, the cable 190 will be actuated and the receiver 183 raised into a horizontal position against the tension of the spring 188, as shown by dotted lines in Fig. 24.

Immediately behind the receiver 183 is a holder 195, which is carried by a shaft 196, as shown in Fig. 8, and the holder extends downward a little below the receiver, and has a forwardly-extending plate 197, which projects beneath the receiver and supports the photograph plates which are dropped into the latter. The shaft 196 has a rearwardly extending arm 198, on which is a counterbalance 199, and when the receiver is tilted upward, the counterbalance will cause the holder to follow it until the holder reaches a nearly horizontal position, at which point the receiver will continue upward and the inclination will be so slight that the plate will not slide from it. The point at which the receiver and holder part may be easily adjusted by means of the counterbalance 199.

A pusher arm 200, is carried by a shaft 201, which is journaled in suitable supports above the fixing tank and in front of the bath tank, and this shaft 201 has an arm 202 on its upper side which is held by a spring 203 so as to normally throw the pusher arm forward as shown in Fig. 23. Another arm on the shaft and on the lower side is secured to a rod 204, which extends backward and connects with an arm 205 on a sleeve 206, held loosely on the countershaft 39, and an arm 207 of this sleeve extends into the path of a cam 208 carried by the driving shaft 24. The cam 208 is narrow, so that during a greater part of the revolution of the driving shaft the pusher arm 200 is held forward, but at the right time the cam strikes the arm 207, and throws it down so as to pull back the arm 205 and the pusher arm 200, thus bringing the lower end of the arm 200 behind the plate carried by the receiver 183, and at this time the receiver with the plate will be in the position shown by dotted lines in Fig. 24. When the cam 208 passes the arm 207, the spring 203 will throw the pusher arm 200 quickly forward, and the arm striking the photograph plate in the receiver, will throw the plate forward upon the tray 12, and the finished picture may thus be easily reached by the purchaser.

The operation of the machine will probably be understood from the foregoing description, but the different operations take place in the following order and manner. A person takes his stand in front of the exposure opening 11, and drops his coin in the slot 13, so that it will pull down the lever 15, and release the driving shaft 24 in the manner described. The operations for taking the picture all take place during one revolution of the driving shaft. When the shaft starts, the cam 49 will be in the position shown in Fig. 18, and will immediately release the arm 48, and the plate fly 42 will spring upward into a vertical position and will hold in place the photograph plate which has been left in front of the fly by a previous operation. At about the same time the cam 41 will actuate the arms 40 and 37 and the gear wheel 32, thus releasing the shutter 31, and exposing the plate. At nearly the same instant, too, the lever 119 will be tilted by its connected cam mechanism, shown in Fig. 6, and a charge of developing liquid will be let into the bulb 107. The arm 126 will by this time have tilted the bell-crank 130, and withdrawn the valve 138, so as to permit the developing charge to flow into the bath tank 74, and the plate 73 will be withdrawn by means of the mechanism connected with the cam 79, as shown in Fig. 21, and the plate dropped into the developing bath. The plate is allowed to remain momentarily, but soon the rod 90 is actuated by means of its connection with the cam 94, and the valve 80 thrown backward into the position shown in Fig. 8, and the plunger 145 is tripped, the drum 158 having moved so as to move the cable 147 to permit the plunger to drop, and the plunger dropped downward behind the lens tube and through the bath tank, and the plate therein carried down into the receiver 183. The bath liquor passes out through the gutter 142 in the manner described, and the continued movement of the cam 94 again closes the valve 80 so as to prepare the bath tank for another charge. The drum 158 will also be tripped in the manner described and the weight or counterbalance 150 will return the cable 147 which will raise the plunger 145 to its upper position. After the plate has been immersed in the fixer, the cable 190 is actuated by means of its connection with the cam 194 and the receiver 183 raised into a horizontal position, the holder 195 following it through a quarter of its movement in the manner described, and when the receiver has reached the horizontal position the pusher arm 200 is tripped by the cam 208, and the plate which is now a finished picture is thrown forward upon the tray 12. The final movement of the driving shaft will actuate the pitman 64 and the feeding mechanism of the photograph plate holder 53, and a plate will be dropped through the chute 43 in front of the fly 42, ready for the next operation.

Having thus described my invention, I claim as new, and desire to secure by Letters Patent,—

1. In a photograph machine, the combination, of the driving shaft having a slotted disk thereon, a coin-operated lever having a bent arm to enter the disk slot, and a flexible spring held to the disk so as to loosely cover the slot, substantially as described.

2. A coin-operated photograph machine, comprising a lens tube having a vertically-movable shutter at one end, and a swinging plate-holding fly at the other, a photograph holder held above the lens tube and connected with the rear end of the same by a chute, a developing bath tank arranged beneath the plate fly, a fixing bath held beneath the developing bath tank, a swinging receiver arranged in the fixing bath and adapted to receive a plate from the developing bath tank, a coin-controlled driving shaft, and an operative connection between the shaft and the movable parts described, substantially as set forth.

3. The combination, with the lens tube, the plate holding fly held behind the tube, the developing bath tank held beneath the plate-holding fly, and suitable means for supplying a liquid to the bath, of a swinging valve held to close the bath tank, a fixing bath held below the developing bath tank, a swinging receiver arranged in the fixing bath and adapted to receive a plate from the developing bath, and a coin-controlled driving shaft adapted to operate the swinging valve and the receiver, substantially as described.

4. In a photograph machine, the combination, with the lens tube, the plate chute adapted to deliver a plate at the rear end of the tube, and the swinging fly adapted to hold the plate in position, of the bath tank arranged beneath the fly, a swinging plate adapted to close the top of the tank, a swinging valve held to close the bottom of the tank and adapted to swing from beneath the same, and a coin-controlled driving shaft operatively connected with the valve, the swinging plate and the swinging fly, substantially as described.

5. The combination, with the lens tube, of a vertically-movable shutter held at the front end of the tube, a gear wheel arranged behind the shutter and operatively connected therewith, a coin-controlled revolving shaft, and a cam mechanism operated by the shaft and adapted to revolve the gear wheel, substantially as described.

6. In a photograph machine, the combination with the open-bottomed plate holder having plates therein with notches in their sides and ends, of slides adapted to register with the notches and held to move out and in beneath the plate holder, substantially as described.

7. In a photograph machine, the combination, with the open-bottomed plate holder having plates therein with side and end notches, of racks arranged on the four sides of the holder and having projections to extend beneath the holder and in line with the plates, and a gear mechanism for alternately moving the racks on opposite sides, substantially as described.

8. The combination, with the open-bottomed plate holder adapted to deliver into a chute, and the plates carried by the holder, alternating plates having notches on their sides and ends, of reciprocating racks held on the four sides of the holder and provided with projections to register with the notches in the plates, shafts journaled on the sides of the holder and having gear wheels to engage the racks, a coin-controlled driving shaft, and an operative connection between the driving shaft and the plate-holder shafts, substantially as described.

9. A photograph machine, having a lens tube and coin-controlled means for holding a plate behind the same, a tank holding developing liquid held above the tube, a tank holding fixing liquid held beneath the tube, the developing bath tank being held beneath the inner end of the tube and above the fixing tank, a coin-controlled valve mechanism for conducting the developing liquid from the main tank to the bath tank, coin-controlled mechanism for discharging the plates from the bath tank to the fixing tank, and coin-controlled mechanism for raising the plate from the fixing tank, substantially as described.

10. In a photograph machine, the combination, with the bath tank adapted to receive a photograph plate and discharge the same, of a tank holding developing liquid and held above the bath tank, said main tank having openings in top and bottom, connected valves held to close the openings, a tube extending from beneath the lower opening to below the bath tank, and coin-controlled mechanism for operating the valve, substantially as described.

11. The combination, with the developing bath tank and the main tank having openings at the top and bottom, of valves held to close the openings, a bulb connected with the lower opening and adapted to hold a charge for the bath tank, a valve to close the bulb, a tube leading from the bulb to the bath tank, and a coin-controlled cam mechanism for operating the valves, substantially as described.

12. In a photograph machine, the developing bath supplying mechanism, comprising a tank having openings at top and bottom, a bulb connected with the lower opening and with the air, the bulb being adapted to hold a charge of liquid, a spring-pressed valve held to close the bulb, valves held to close the openings in the main tank, and a coin-controlled cam mechanism for successively operating the main tank valve and the bulb valve, substantially as described.

13. In a photograph machine, the combination, with the main tank and the charging bulb connected therewith and having an outlet tube, of spring-pressed parallel rods connected at one end by a crosshead, a valve carried by the crosshead and adapted to close the bulb tube, a coin-controlled driving shaft, and a cam mechanism operated by the shaft and adapted to move the rods against the tension of their spring, substantially as described.

14. In a photograph machine, the combination, with the lens tube, the plate-holding fly, and the developing bath tank held beneath the inner end of the tube, of a plunger held to move downward between the plate and fly and through the developing bath tank, so as to push a plate through the latter substantially as described.

15. The combination, with the plate-holding mechanism behind the lens tube, and the developing bath tank arranged beneath the inner end of the lens tube, of the counterbalanced plunger held to move downward behind the lens tube and through the bath tank, and coin-operated mechanism for tripping the plunger to permit it to drop by successive intermittent movements behind the lens tube and through the bath tank, substantially as described.

16. The combination, with a vertically-movable plunger adapted to move behind the lens tube and through the bath tank, of a counterbalanced cable having a sliding connection with the plunger and adapted to hold the same in an elevated position, a coin-operated driving shaft connected with the cable so as to move the same downward, a tripping lever held to engage projections on the plunger, and an operative connection between the tripping lever and the driving shaft, substantially as described.

17. The combination, with a vertically-movable plunger which moves behind the lens tube and through the developing bath tank, of a counterbalanced cable having a sliding connection with the plunger whereby the latter may be raised, a coin-controlled driving shaft, a drum mounted on the shaft and connected with the cable, means for releasing the drum at each revolution of the shaft, a tripping lever held adjacent to the plunger and adapted to engage projections thereon, and a cam mechanism for tripping the lever by the movement of the driving shaft, substantially as described.

18. In a photograph machine, the combination with the picture developing mechanism employing a plate ejecting plunger and the plunger working cable, of a drum for carrying the cable, the drum being held loosely on a revoluble shaft and having a stud on one side, a collar fixed to the shaft adjacent to the drum, a spring-pressed lever carried by the collar and held to engage the stud, and a releasing arm adapted to disengage the stud and lever at each revolution of the drum, substantially as described.

19. In a photograph machine the combination, with the picture developing mechanism having a plate ejecting plunger and the counterbalanced plunger carrying cable and its carrying drum held to oscillate on a supporting shaft, of a lever pivoted on the drum and held to move between the retaining studs, the lever extending into the path of a stationary support, substantially as described.

20. In a photograph machine, the combination, with the developing bath tank, having suitable means of supplying liquid thereto and arranged to receive a photograph plate, of a swinging valve held to close the lower end of the tank, an oscillating crank shaft connected by rods with the sides of the valve, a coin-controlled driving shaft, and a cam mechanism for operating the crank shaft by the movement of the driving shaft, substantially as described.

21. The combination with the developing bath tank having a suitable means of supply at the top and a swinging valve at the bottom, the latter being arranged to move slightly away from the tank and deflect the liquid to one side, of an open gutter held to receive the liquid from the valve and adapted to deliver it into a suitable receptacle, substantially as described.

22. The combination, with the bath tank, the swinging valve for closing the tank, and the crank shaft connected with the valve, of a revoluble driving shaft, a crank held loosely to the crank shaft and connected by a cam mechanism with the driving shaft, and a yielding connection between the crank and the crank shaft, substantially as described.

23. The combination, with the developing tank having a supply apparatus at the top and having its lower end cut off diagonally, of a counterbalanced valve held to close the lower end of the bath tank, an oscillating crank shaft connected by rods with the valve so as to swing it against the lower end of the tank, a coin-controlled driving shaft, and an operative cam mechanism for oscillating the crank shaft from the driving shaft, substantially as described.

24. In a photograph machine, the combination, with the developing bath tank having a swinging valve at its lower end, of a fixing bath held beneath the developing bath tank, a swinging receiver open at its lower end, held to enter the fixing bath and in alignment with the developing bath tank, a swinging holder held behind the receiver and having a plate adapted to project beneath the receiver behind, a coin-controlled driving shaft, and a cam mechanism carried by the shaft and adapted to swing the receiver into a horizontal position, substantially as described.

25. The combination, with the swinging receiver having an open lower end and adapted to hold a photograph plate, of an independent counterbalanced holder held behind the receiver and having a bottom plate projecting beneath the receiver, and a cam mechanism for swinging the receiver into a horizontal position, substantially as described.

26. The combination, with the swinging open-bottomed receiver, of a cam operated pusher arm held to swing between the sides of the receiver when the latter is in a horizontal position, substantially as described.

27. The combination, with the swinging receiver, having an open free end, of a spring-pressed pusher arm adapted to swing between the sides of the receiver, a coin-controlled driving shaft, and a cam mechanism for moving the pusher arm against the tension of its spring, substantially as described.

28. The combination, with the delivery tray, and the swinging receiver having an open free end and adapted to swing opposite the tray, of a spring-pressed pusher arm adapted to swing through the receiver and deliver a plate upon the tray, substantially as described.

29. In a photograph machine the combination with the main tank, of a charging bulb connected with the tank having a valve controlled inlet and outlet and an air pipe opening from it, a coin controlled driving shaft, and operative connections between the valves and the shaft, substantially as described.

30. The combination with the bath tank, and the waste gutter below and adjacent to it, of the swinging valve held to close the tank bottom, and means, for opening the valve by successive movements, its first movement adapting it to deflect the liquid from the tank to the gutter its second movement throwing it wide open and its third movement closing it, substantially as described.

PIERRE V. W. WELSH.

Witnesses:
WARREN B. HUTCHINSON,
E. M. CLARK.